US006840774B2

(12) United States Patent
Fretwell, Jr.

(10) Patent No.: US 6,840,774 B2
(45) Date of Patent: Jan. 11, 2005

(54) SYSTEM TO TEACH, MEASURE AND RATE LEARNER KNOWLEDGE OF BASIC MATHEMATICS FACTS

(76) Inventor: Jack W. Fretwell, Jr., 11729 N. Shore Dr., Reston, VA (US) 20190

( * ) Notice: Subject to any disclaimer, the term of this patent is extended or adjusted under 35 U.S.C. 154(b) by 259 days.

(21) Appl. No.: 10/136,803

(22) Filed: May 1, 2002

(65) Prior Publication Data

US 2002/0164564 A1 Nov. 7, 2002

Related U.S. Application Data

(60) Provisional application No. 60/289,296, filed on May 7, 2001.

(51) Int. Cl.$^7$ .............................. G09B 5/00; G09B 7/00
(52) U.S. Cl. ........................ 434/201; 434/323; 434/362
(58) Field of Search ................................ 434/118, 201, 434/211, 234, 307 R, 308, 322, 323, 362, 365, 350; 345/863; 358/1.15

(56) References Cited

U.S. PATENT DOCUMENTS

| | | | | | |
|---|---|---|---|---|---|
| 4,867,685 A | * | 9/1989 | Brush et al. | ................ | 434/234 |
| 5,139,423 A | * | 8/1992 | McCormack et al. | ....... | 434/201 |
| 5,204,813 A | * | 4/1993 | Samph et al. | ................ | 434/362 |
| 5,584,699 A | * | 12/1996 | Silver | .......................... | 434/201 |
| 5,596,698 A | * | 1/1997 | Morgan | ...................... | 345/863 |
| 5,820,386 A | * | 10/1998 | Sheppard, II | ............... | 434/322 |
| 5,842,869 A | * | 12/1998 | McGregor et al. | .......... | 434/201 |
| 6,018,617 A | * | 1/2000 | Sweitzer et al. | ........... | 358/1.15 |
| 6,282,404 B1 | * | 8/2001 | Linton | ......................... | 434/350 |
| 6,551,104 B2 | * | 4/2003 | Becker | ........................ | 434/201 |
| 2002/0068264 A1 | * | 6/2002 | Gu et al. | ..................... | 434/323 |

* cited by examiner

Primary Examiner—Joe H. Cheng
(74) Attorney, Agent, or Firm—Roland H. Shubert

(57) ABSTRACT

A system for teaching basic arithmetic facts to students and for measuring their progress and rating their knowledge using a computer program that provides repetitive practice and immediate positive reinforcement is provided. The system features structured practice using problem sets of progressing levels of difficulty with problems selected randomly from each set. Progress made by individual students is tracked by generating a proficiency rating that reflects the arithmetic function tested, the level of difficulty of the problems presented, and the percentage of correct answers provided within a preset time period. Summary reports are generated and displayed at the end of each session as are the proficiency ratings.

9 Claims, 4 Drawing Sheets

SYSTEM TO TEACH, MEASURE AND RATE LEARNER KNOWLEDGE OF BASIC MATHEMATICS FACTS

REFERENCE TO RELATED APPLICATION

This application claims the benefit under 35 U.S.C. §119(e) of U.S. Provisional Application No. 60/289,296, filed May 7, 2001.

BACKGROUND OF THE INVENTION

1. Technical Field

This invention relates generally to a system that uses a computer program for teaching basic facts about mathematics and to build and measure the proficiency and speed of a learner in solving problems in addition, subtraction, multiplication, and division.

More specifically, this invention relates to methods and means for teaching to students arithmetic functions including addition, subtraction, multiplication, and division, and to measure the progress of individual students in mastering that subject matter.

2. Description of Related Art

Traditional approaches to teaching arithmetic computations to students have usually involved some amount of rote learning through repetitive practice using pencil and paper or flash cards and the like. Electronic calculators of various types have also been used as teaching tools by arranging for the calculator to generate a problem to be solved without displaying the answer. The student inserts a proposed answer into the calculator which then indicates whether the answer is correct or incorrect. Examples of calculators that are arranged to be used as teaching tools are disclosed in U.S. Pat. Nos. 3,787,988 and 4,051.605 among others.

Rote learning techniques involving repetitive practice have fallen into disrepute among some segments of the educational community, being slightingly referred to as "drill and kill." That hostility to rote learning often seems particularly marked in the teaching of arithmetic functions to beginning level students. Abandoning the use of rote learning, however, tends to result in a portion of the student population failing to master even the most simple of arithmetic calculations.

It is evident to many within the educational community that practice is necessary for a student to master basic mathematical relationships, and that teaching techniques which challenge a student to learn and succeed are both useful and desirable. The computer program of this invention fills those needs.

SUMMARY OF THE INVENTION

The computer program of this invention uses either a personal computer or a networked computer terminal to present arithmetic problems in addition, subtraction, multiplication, and division for solving by a student operator. Problems are presented in sets, each set representing a specified level of difficulty. A student operator calls up a problem that the student then solves by inserting an answer using the computer keyboard. Elapsed time between problem call-up and answer entry is measured and the answer is graded as right or wrong. The program tracks the problems that are answered correctly on the first attempt within a specified time interval. These data are then used to generate a proficiency rating that reflects the arithmetic function tested, the level of difficulty of the problems presented, and the percentage of correct answers to the problems presented. A progress report is generated for the student operator, and a detail report of each session is maintained.

Hence, it is an object of this invention to provide a system to teach arithmetic calculations to students and to maintain a record of the progress made and proficiency attained.

It is another object of this invention to provide a teaching system that competitively challenges a student to master arithmetic calculations while minimizing the boredom of rote learning.

Yet another object of this invention is to provide teaching means that provides structured practice with immediate non-aversive feedback.

Other objects of this invention will become apparent from the following description of a preferred embodiment of the invention.

DESCRIPTION OF PREFERRED EMBODIMENTS OF THE INVENTION

Figure 1:
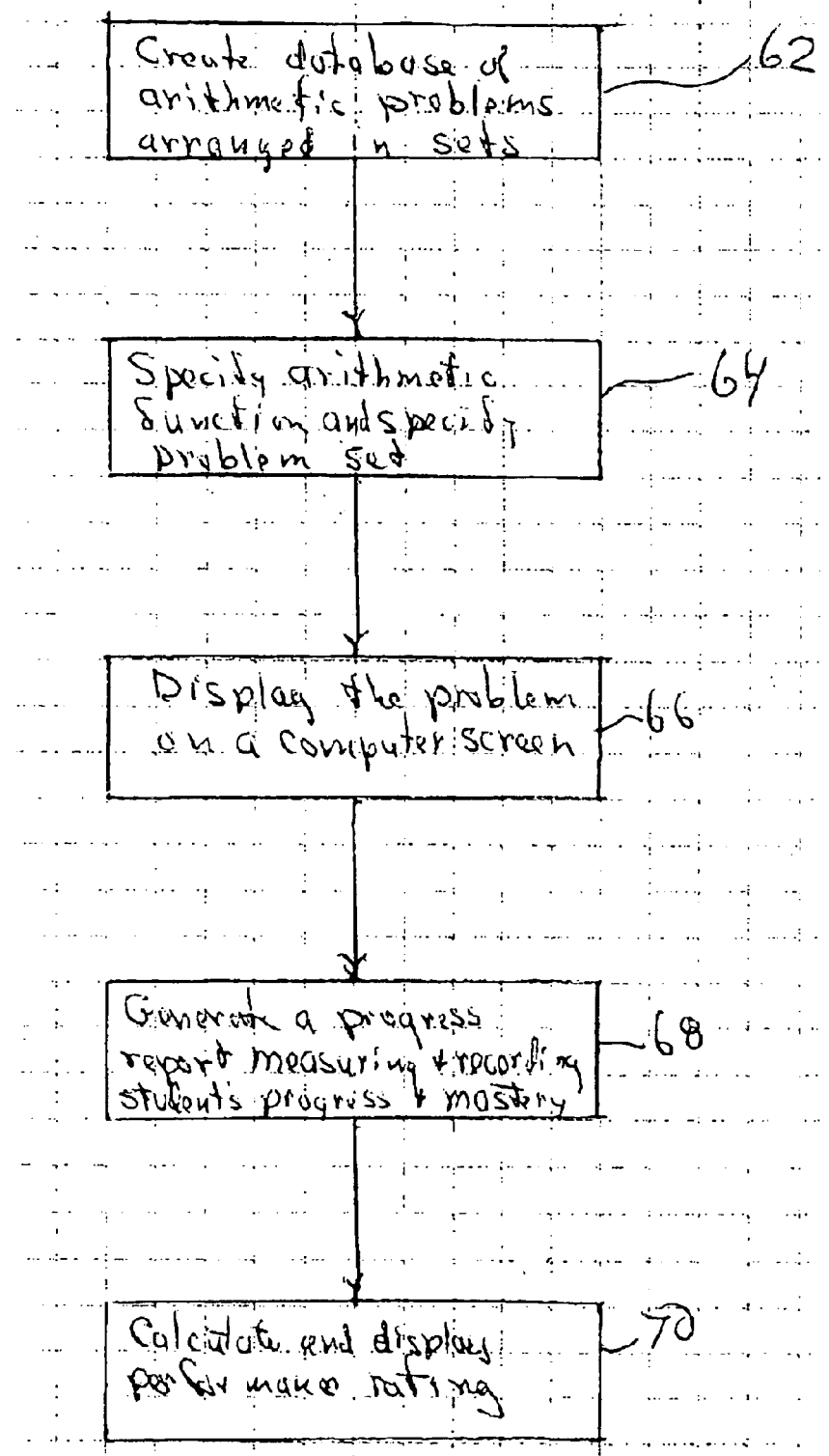
FIG. 1 is a diagrammatic representation of the system for teaching arithmetic calculations that is set out in this application.

The teaching system of this invention will be described with reference first to FIG. 1 which diagrammatically depicts the teaching system 60 of this invention. A database 62 that contains all possible arithmetic problems in addition, subtraction, multiplication, and division of single digit numbers, as well as the answers to those problems, is first created. Those problems are arranged in a plurality of sets, each set representing a specified level of difficulty.

A student using the system then specifies at 64 the arithmetic function to be studied and selects a problem set according to the level of difficulty desired for that particular user session. Problems randomly chosen from the selected problem set are displayed on a computer screen at 66 and the system then guides the student in its use following the procedures illustrated by the logic diagrams of FIGS. 2, 3, and 4. At the end of the user session, a progress report that measures and records that student's progress and mastery of the arithmetic facts being taught is generated at 68. A user session may also be employed to analyze a student's performance during that session and to calculate a performance rating in a manner that is described in more detail in relation to FIG. 3. That calculated performance rating is graphically displayed at 70 at the end of the rating session, preferably as a bar graph.

Figure 2:
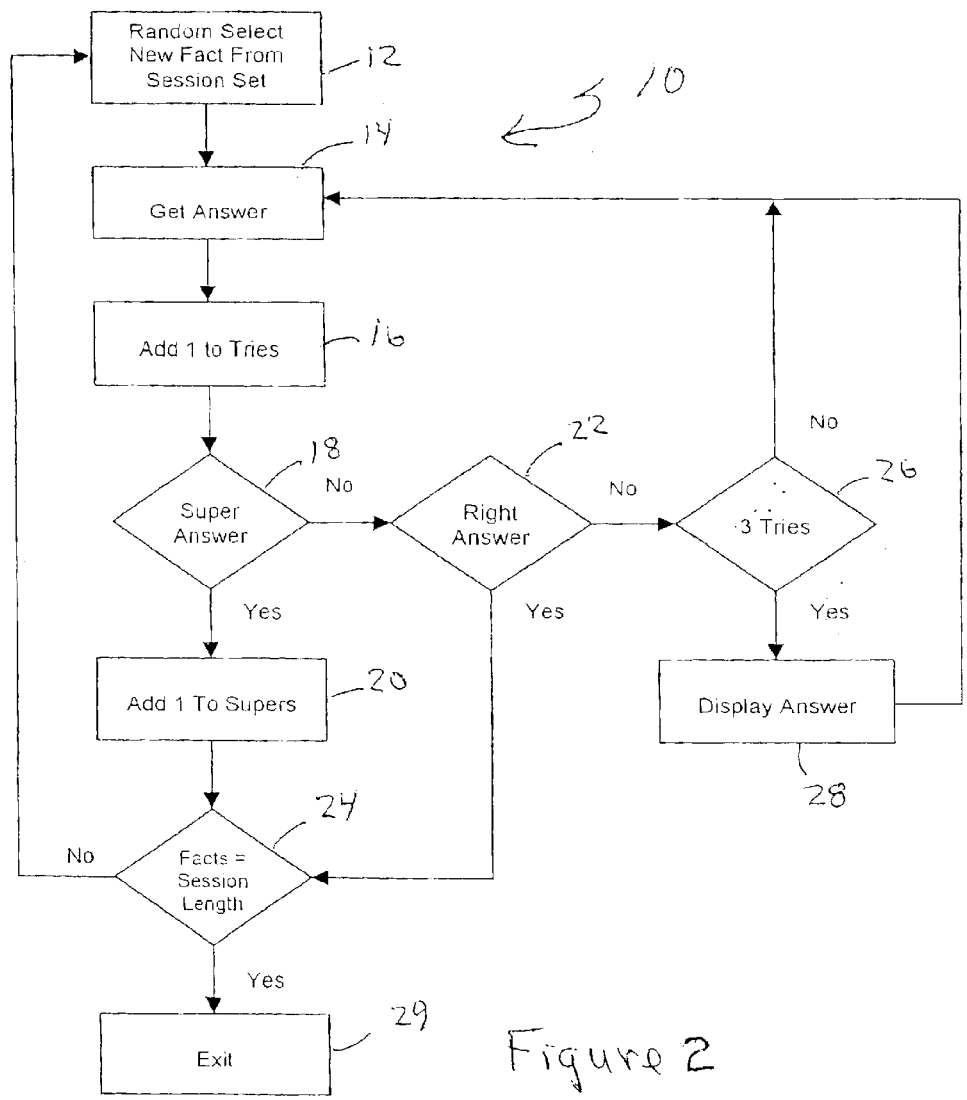
FIG. 2 is a logic diagram of an individual user session.

Referring now to FIG. 2, there is shown a diagram 10 of the logic employed in the computer program learning system of this invention to guide and govern an individual practice or performance rating session. Prior to beginning the session the program must be set up to present any desired mix of problems or facts that involve one or more of the arithmetic functions of addition, subtraction, multiplication and division. For the purposes of this disclosure, the terms "facts" and "problems" are considered to be synonymous. A level of difficulty is also specified as is the number of problems that make up a set. The length of an individual session may be fixed by specifying the number of problems presented in a session. A summary report is produced and displayed at the session end.

After the parameters have been set, a student begins a session by calling at 12 for the presentation of a fact or problem by clicking a mouse on a defined screen location or by striking the enter key. A randomly chosen problem from the session set that was defined by the selected parameters is then displayed on the computer screen, and the student responds by entering an answer 14. The problem is retrieved from a database that contains all possible problems from the basic arithmetic tables for addition, subtraction, multiplication and division of single digit numbers.

The entered answer is tabulated at 16 to add one to the number of tries, or answers entered. The answer is then evaluated at 18 to determine whether or not the answer was entered within a preset time interval and so qualify as a special or a "super" answer. It has been found in practice that a student displays mastery of a problem when it is solved within a short time period, typically three seconds. The entered answer is considered to be a "super" answer when the problem is correctly solved in one try within that time interval, and in that event the number of supers is increased by one unit at 20. That 3-second setting to define a super answer may be lengthened for students that are just getting started, or for other special reasons. Also, the 3-second setting may be reduced to create an extra challenge for advanced students.

An answer entered by the student that does not qualify as a super answer, i.e., answered correctly in less than three seconds, is evaluated at 22 to determine whether it is correct or incorrect. If the answer is correct, then the number of problems attempted is increased by one at 24. If the entered answer proves to be incorrect, the answer is erased and the student is requested to try again until logic unit 26 determines that the student has made three failed attempts. At that time, the correct answer is displayed at 28 and the student then must insert the correct answer in order to proceed to the next problem. The number of supers registered at 20 is combined with the number of other problems attempted registered at 22 to obtain a unitary total of the number of problems answered and attempted by the student. The session ends when that total equals the number of problems specified for the session. At that time an automatic session feedback report is generated for the student and the student exits the program at 29.

Figure 3:
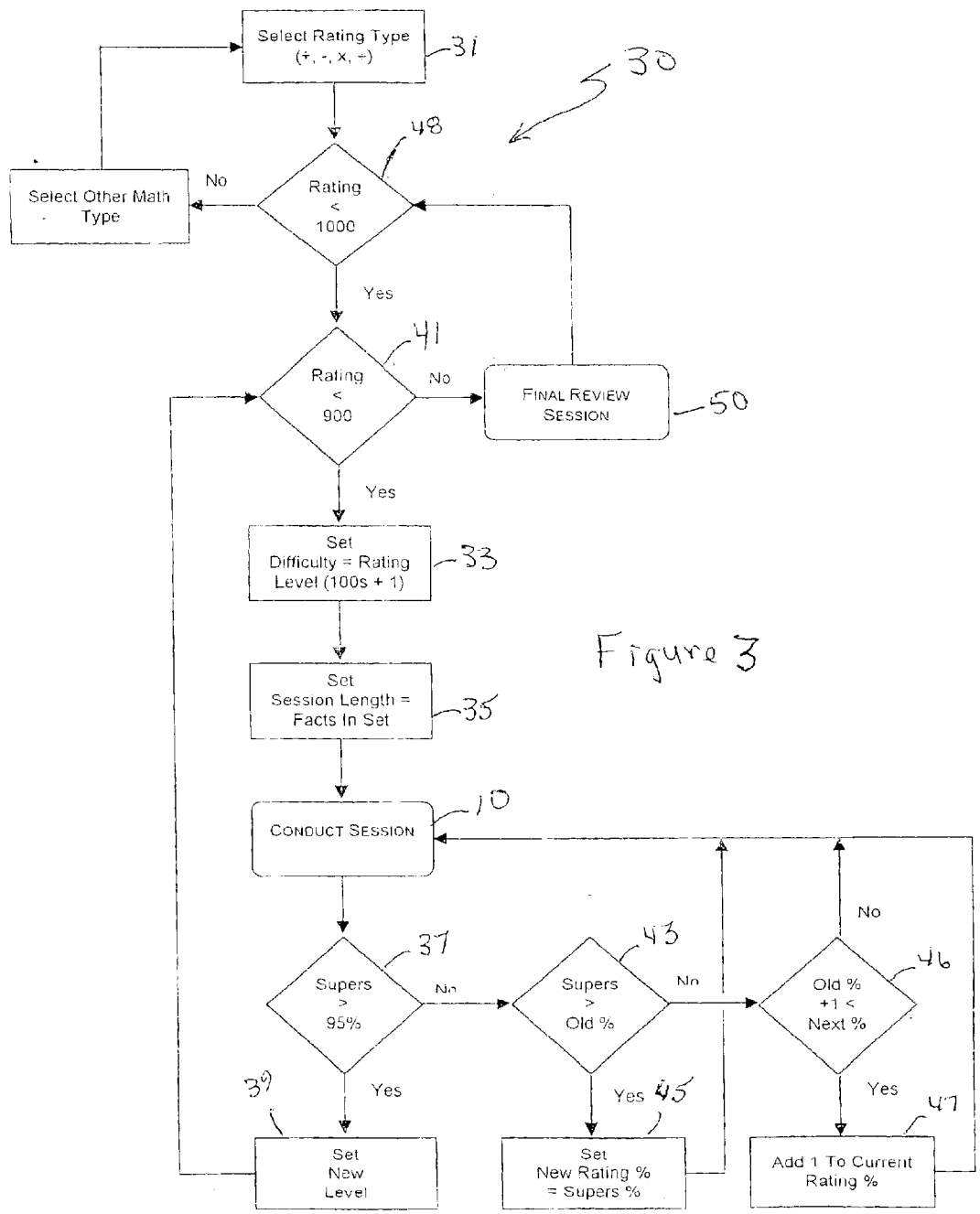
FIG. 3 is a logic diagram of the performance that measures and records progress of individual students.
Figure 4:
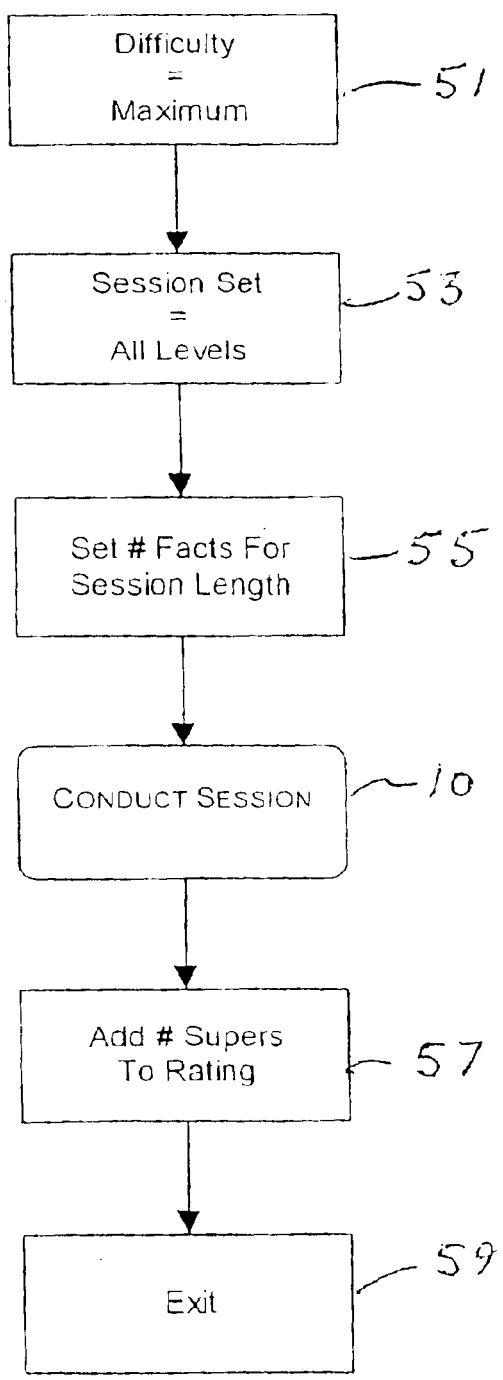
FIG. 4 is a logic diagram of the final session review.

The computer learning system of this invention includes means to calculate a performance rating for each student using the program. FIG. 3 presents a logic diagram 30 that illustrates how a performance rating is determined through analysis of a student's performance during a session. A student is ordinarily ready to play for rating as soon as he or she can routinely solve problems at a defined skill level in three seconds or less. Ratings are based on a numerical scale, preferably on a scale of 0–1000. For ratings in the range of 0–900, the first digit represents the level at which the student has achieved mastery by providing 100% super answers in a single session. A single level is a set of ten problems or facts in either addition or subtraction (based on the integers 0–9) and a set of eleven problems or facts in either multiplication or division (based on the integers 0–10.) There are nine levels in addition and subtraction and ten levels in multiplication and division. The next two digits show the current super percentage at the next level with points added for each attempt at improvement.

In playing for rating a student first selects the rating type, or arithmetic function to be tested, at 31. Next, the difficulty rating 33 is set at a level that is one higher than the level at which the student had previously demonstrated mastery. The session length is then fixed at 35 according to the number of facts or problems in the set; ten for addition and subtraction, eleven for multiplication and division. The different skills, or arithmetic functions tested, may be done in any order but only one function may be tested at a time so that diagnostic review can be conducted more precisely. Practice sessions may differ from rating sessions to allow a combination of skills, for example addition and multiplication, to be done at the same time. When done in combination the number of problems in the practice session set is the total of those in the skill sets selected. Were the combination of addition and multiplication to be selected for a single level of difficulty, then the number of problems in the session set would be ten for addition and eleven for multiplication for a total of twenty one.

The play for rating session is conducted according to the logic protocol 10 that was set out in FIG. 2. Answers to the problems posed in the set are evaluated at 37 to determine how many are super answers. If 95% or more of the answers are super answers, then the level of the student is advanced at 39 to the next higher level, and that higher level is reflected in the student's rating 41. If, however, less than 95% of the answers are super answers then a determination 43 is made as to whether the percentage of super answers attained in the rating session is greater than that attained in a previous attempt. If yes, a new rating that is equal to the percentage of super answers among the problems attempted is determined at 45. That new rating is then displayed as the second and third digits of the rating score. In the event that the student did no better than in a previous play for rating session the later score is compared to the previous one at 46 and 47 and the score is adjusted so that the rating is at least one digit higher than was earned in the previous effort. That adjustment serves as another positive reinforcement by providing a tangible reward for the attempt.

At the time that a student's play for rating efforts result in attaining a numerical score that is above 900 for a particular skill or function, a final review session 50 is instituted. A diagram of the logic flow of session 50 is presented as FIG. 4. Referring now to that Figure the level, or the difficulty 51, of the problems presented is fixed at the maximum. That maximum is a level of 9 for addition and subtraction and a level of 10 for multiplication and division. Next, instructions are provided at 53 to cause the problems presented to the student include all problems of varying difficulty up to the maximum level. The number of problems or facts to be presented at the session is controlled at 55, and the session 10 is then conducted according to the logic protocol described in FIG. 2. The number of super answers attained in this session is then added at 57 to the student's previous rating and the session is then ended at exit 59.

The rating that resulted from session 50 is evaluated at 48 (FIG. 3) to determine whether the goal of a 1000 score has been reached. Reaching that goal is a demonstration that the student has mastered the arithmetic function under test, and at that time another math type is selected at 49 to play for rating. The procedure is repeated for each arithmetic function, addition, subtraction, multiplication and division, until the student has attained a rating of 1000 in each.

The teaching system of this invention is most effective when used in short sessions, five minutes or so, three to five times a week. Beginning practice at the easiest level serves to generate initial success and establishes keyboard skills that are useful at higher levels and in different subject areas. Progress is assured by advancing in small steps of increasing difficulty. Immediate positive reinforcement follows each element of success with instant feedback as to accuracy and response time for each answer submitted. A display of results automatically follows at the end of each session with a summary of session criteria as specified through user interface controls, and including the average time of response for all of the problems presented at the session as well as the percentage of problem responses that met or exceeded the specified standard. That same display of results can also be called up at other times including during the session.

Play for rating results are preferably displayed as a bar graph that plots the score achieved by the student in each arithmetic function, and updates that graph with each succeeding rating session. The system also provides a running summary of session results and a personalized session progress report. Tangible evidence of math achievement is provided in the form of individual certificates showing students' performance and current status. An item detail report of each session is available for teacher and parent diagnostic review.

While this invention has been described with reference to a preferred embodiment thereof, it will be understood by those skilled in the art that various changes in form and detail may be made without departing from the spirit and scope of the appended claims.

I claim:

1. A method for teaching arithmetic facts to students comprising:

creating a database that contains all possible problems for the arithmetic functions of addition, subtraction, multiplication, and division of single digit numbers, said problems arranged in sets, each set representing a specified level of difficulty;

specifying the arithmetic function to be taught to a student and the problem set to be used in that teaching session;

randomly choosing a problem from said problem set, and displaying said problem on a computer screen;

measuring the time interval between display of said problem and entry of a student's response thereto on said computer screen;

determining whether an answer entered in response to said displayed problem is correct and, if said time interval for response is less than a preset standard and said answer is also correct, designating said answer as a super answer;

displaying each incorrectly answered problem on the computer screen for at least one additional time and, if said displayed problem is not answered correctly, displaying the correct answer thereto on said computer screen;

continuing the random selection and display of problems until all of the problems within the set have been chosen, and thereafter ending said teaching session; and generating a progress report that measures and records a students performance and mastery of the arithmetic facts being taught.

2. The method of claim 1 wherein said preset standard time interval is about three seconds.

3. The method of claim 1 wherein each problem that is answered incorrectly on the second presentation is displayed a third time.

4. The method of claim 3 wherein the correct answer is displayed for each problem that is answered incorrectly on the third presentation, and wherein that correct answer must be re-entered by the student on said computer screen before the next problem can be chosen.

5. The method of claim 1 wherein a performance rating is determined through analysis of a student's speed and accuracy in answering problems presented during a teaching session.

6. The method of claim 5 wherein said rating is based on a numerical scale of 0–1000.

7. The method of claim 6 wherein the first digit in a numerical score in the range of 0–900 represents the level at which a student has achieved mastery by providing super answers to problems presented.

8. The method of claim 7 in which the second and third digits of said numerical score represent the percentage of super answers among the problems attempted.

9. The method of claim 8 wherein the performance rating attained is presented as graphical display at the end of the rating session and wherein said display is updated at each succeeding rating session.

* * * * *